United States Patent [19]

Sridharan

[11] Patent Number: 5,581,449
[45] Date of Patent: Dec. 3, 1996

[54] PLUG-IN POWER SUPPLY

[75] Inventor: Sri Sridharan, Hickory Hills, Ill.

[73] Assignee: Radionic Industries, Inc., Chicago, Ill.

[21] Appl. No.: 193,558

[22] Filed: Feb. 8, 1994

[51] Int. Cl.$^6$ .................................. H02M 7/06
[52] U.S. Cl. .................. 363/146; 363/53; 363/126
[58] Field of Search ..................... 363/52, 53, 125, 363/126, 146

[56] References Cited

U.S. PATENT DOCUMENTS

| | | | |
|---|---|---|---|
| 3,237,079 | 2/1966 | Mas | 363/146 |
| 3,379,952 | 4/1968 | Tarrson | 363/146 |
| 4,039,900 | 8/1977 | Roback et al. | 363/146 |
| 4,109,193 | 8/1978 | Schultheis | 363/146 |
| 4,460,954 | 7/1984 | Aiken et al. | 363/75 |
| 4,652,988 | 3/1987 | McLain et al. | 363/146 |
| 4,977,482 | 12/1990 | Langdon et al. | 363/146 |
| 5,001,623 | 3/1991 | Magid | 363/53 |
| 5,097,404 | 3/1992 | Layh | 363/146 |
| 5,168,438 | 12/1992 | Smith | 363/125 |
| 5,243,510 | 9/1993 | Cheney | 363/146 |

Primary Examiner—Jeffrey L. Sterrett
Attorney, Agent, or Firm—Hill, Steadman & Simpson

[57] ABSTRACT

A plug-in transformer power supply having magnetic and electronic circuits is optimized for output power while complying with UL Class 2 limits. In an embodiment, a 12 VDC unit capable of 21 W of output power is disclosed. In another embodiment, a 24 VDC unit capable of 33.6 W of output power is disclosed.

9 Claims, 2 Drawing Sheets

PLUG-IN POWER SUPPLY

BACKGROUND OF THE INVENTION

The present invention is directed generally to power supplies. Specifically, the invention is directed to plug-in transformer power supplies.

Many of today's office appliances use direct current (DC) motors because they are mass produced and, as a result, are less expensive and readily available for many applications. Consequently, there is a great need for developing a highly efficient plug-in transformer power supply to operate these motors.

While many office machines use 24 volts direct current (VDC) power, output power generally is limited in prior art power supplies.

Additionally, since 12 volt rechargeable batteries have become standard in the industry, plug-in transformer power supplies generally are used to recharge these batteries. However, a limitation of the prior art plug-in power supplies is that the 12 volt units currently available do not output more than 18 watts. In addition to the foregoing, industry standards such as those established by Underwriters Laboratories (UL), Chicago, Ill. set forth operating characteristics for various classes of power supplies. In meeting their standards, it often is necessary to employ over-rated components so that the resulting product meets the standards.

The UL standards include UL Class 2 power units defined by UL standard 1310 and Table 28.1 dated Feb. 28, 1989; and UL Class 105 (a/k/a Class A) and UL Class 130 (a/k/a Class B) insulations defined by Table 31.1 of UL 1310 dated Aug. 21, 1992, all of which are incorporated herein by reference.

SUMMARY OF THE INVENTION

The present invention provides a plug-in power supply with a relatively high power output.

In an embodiment, the present invention provides a plug-in transformer power supply with magnetic and electronic circuits maximized for output power while remaining within UL Class 2 requirements for transformer design.

In an embodiment, the present invention provides a plug-in transformer power supply that provides at least 21 watt output levels using UL Class A insulation system but which still meet the UL Class 2 requirements for transformer design.

In an embodiment, the present invention provides a plug-in transformer power supply that provides at least 33.6 watt output levels using UL Class B insulation but which still meets the UL Class 2 requirements for transformer design.

In an embodiment, the invention provides a plug-in transformer power supply apparatus, comprising:

(a) a transformer having a core, a primary winding and a second winding, (b) a filter capacitor connected across the secondary winding;

(c) a rectifier means connected across the secondary winding for converting an AC voltage to a DC voltage;

(d) a recycling thermal protector means for safeguarding an output load from an output short circuit; and (e) a recycling thermal protector means for safeguarding the primary winding from excessive supply voltage.

In an embodiment, the invention provides the transformer characterized by output levels of at least 21 watts while still meeting UL Class 2 requirements.

In an embodiment, the invention provides a plug-in transformer power supply apparatus, comprising a core of electrical grade ¾" lamination with a stack width of 1"; a primary winding with 600 nominal turns of 28 AWG and an approximate DC resistance of 1.61 ohms at 24° C.; a secondary winding with 2×70 nominal turns of 20 AWG and an approximate DC resistance of 0.76 ohms at 24° C.; and a total equivalent internal resistance from the secondary winding side is approximately 1.61 ohms at 24° C.

In an embodiment, the invention provides a plug-in transformer power supply apparatus, comprising a core of electrical grade ¾" lamination with a stack width of 1.18"; a primary winding with 560 nominal turns of 28 AWG and an approximate DC resistance of 15 ohms at 24° C.; a secondary winding with 105 nominal turns of 20 AWG and an approximate DC resistance of 0.45 ohms at 24° C.; and a total equivalent internal resistance from the secondary winding side is approximately 0.98 ohms at 24° C.

These and other features of the invention will become more apparent in the following detailed description of the presently preferred embodiments and accompanying drawings.

DETAILED DESCRIPTION OF THE PRESENTLY PREFERRED EMBODIMENTS

Figure 1:
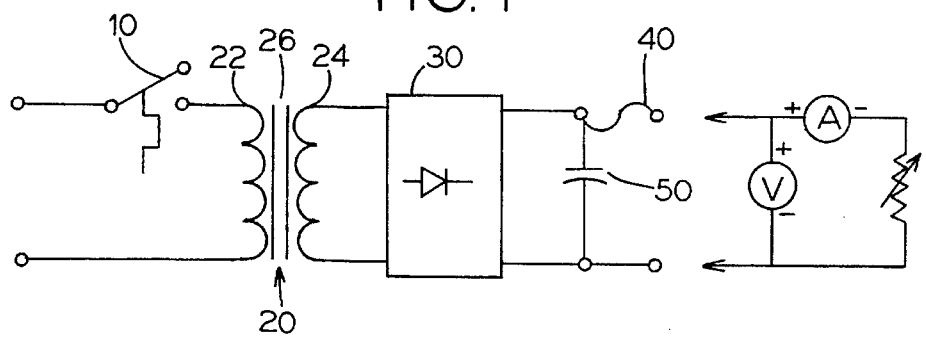
FIG. 1 shows a schematic of a transformer plug-in power supply.

In FIGS. 1–4, presently preferred embodiments of the invention are illustrated. As illustrated in FIG. 1, a presently preferred embodiment includes a transformer circuit 1 that transforms a standard alternating current source voltage (VAC) into 28 volts AC. There is a built-in, recycling thermal protector 10 rated at 120 VAC, 5 amp, 110° C. in series with the primary circuit. A transformer 20 having a primary winding 22 and a secondary winding 24 is connected after the thermal protector 10. The transformer 20 also has a core 26.

As discussed above, in accordance with the invention, the transformer 20 acts initially as a step-down transformer which converts the AC input voltage to approximately 28 volts AC. This stepped-down input voltage then is applied across a rectifier 30. The rectifier 30 is rated at 3 amps and 50 PIV. The resulting rectified stepped-down voltage is applied across an electrolytic filter capacitor 50 with a value of 2200 μF, and rated at 25 volts minimum. Also, a thermal protector 40 rated at 4 amperes is positioned in series with the output for extra safety in case of an accidental short circuit of the output.

Figure 3:
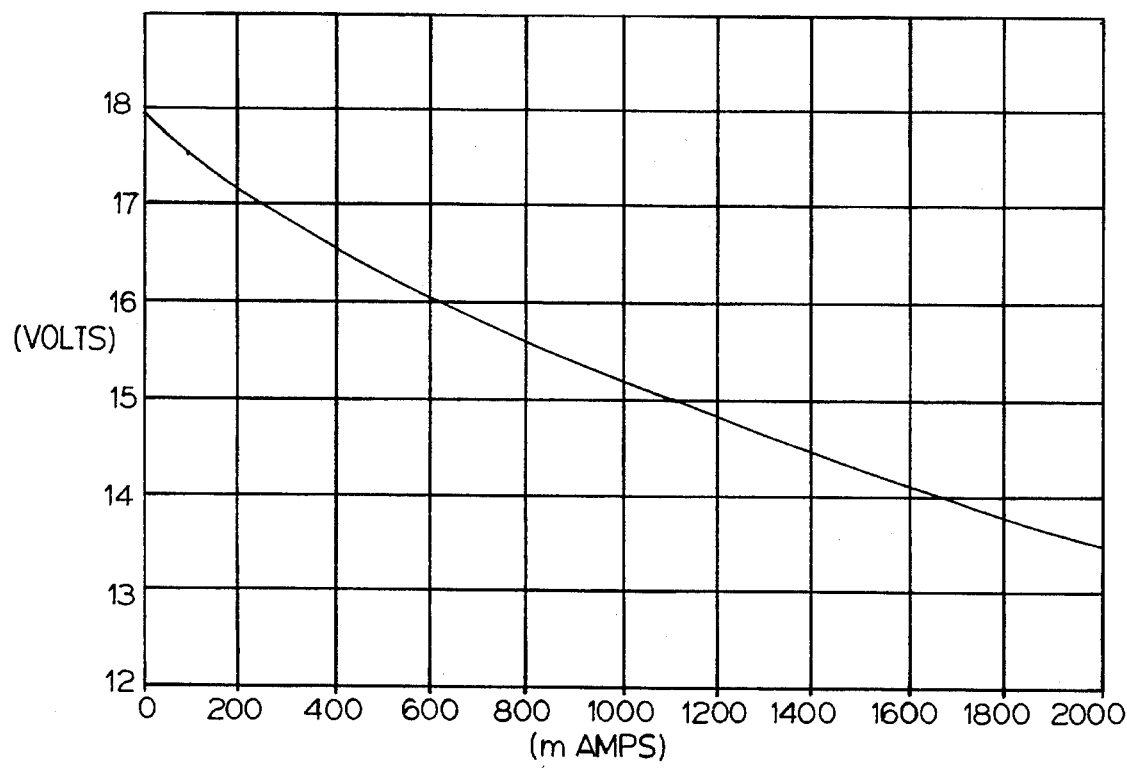
FIG. 3 shows a loading curve of an embodiment of a transformer plug-in power supply.

In FIG. 3, a loading curve for the embodiment of FIG. 1 is illustrated. As can be seen, the output voltage is maintained almost constant over a wide range of output current levels.

Figure 2:
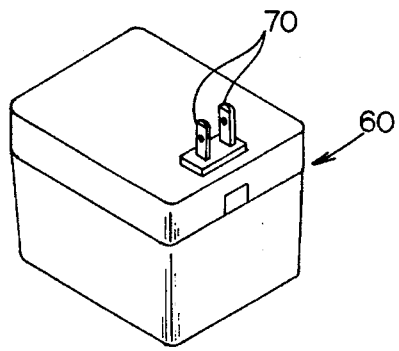
FIG. 2 shows a perspective view of a transformer plug-in power supply.

As illustrated in FIG. 2, an embodiment of the present invention has a rectangular housing or body 60. The housing 60 is also provided with a standard electrical outlet plug 70 for connecting the transformer to the primary power supply. The body 60 houses the above-mentioned components.

An embodiment of the plug-in transformer power supply of the present invention is a 12 VDC unit able to transfer optimum power (approximately 21 W) to the output level using the smallest size E-I transformer. For that purpose, the core 26 of the transformer is made of electrical grade E-I ¾" lamination with a stack width of 1" The primary winding 22 of the transformer has 600 nominal turns of 28 AWG wire with an approximate DC resistance of 15.6 ohms at 24° C. The secondary winding 24 of the transformer has 2×70 nominal turns of 21 AWG wire with an approximate DC resistance of 0.76 ohms at 25° C.

An equivalent internal resistance is determined by the following equation. The reflected impedance looking from the secondary side is equal to $R_s+(R_p/a^2)$, where $R_p$ is the primary resistance, $R_s$ is the secondary resistance and $a$ is the turns ratio of the primary winding to the secondary winding. Thus, the total equivalent internal resistance of the just described embodiment looking from the secondary side of the transformer is approximately 1.61 ohms at 24° C. This embodiment also uses UL Class 105 (a/k/a Class A) insulation to maintain the temperature rises in the power supply within the prescribed limits set by UL.

In another embodiment of the present invention, a 24 VDC plug-in transformer power supply is capable of transferring optimum power (approximately 33.6W) to the output. The core of the transformer is matte of electrical grade E-I ¾" lamination with a stock width of 1.18". The primary winding of the transformer has 560 nominal turns of 28 AWG wire with an approximate DC resistance of 15 ohms at 24° C. The secondary winding of the transformer has 105 nominal turns of 20 AWG wire with an approximate DC resistance of 0.45 ohms at 25° C. Thus, the total equivalent internal resistance looking from the secondary side is approximately 0.98 ohms at 24° C.

This embodiment also uses UL Class 130 (a/k/a Class B) insulation to maintain the temperature rises in the power supply within the prescribed limits set by UL.

Figure 4:
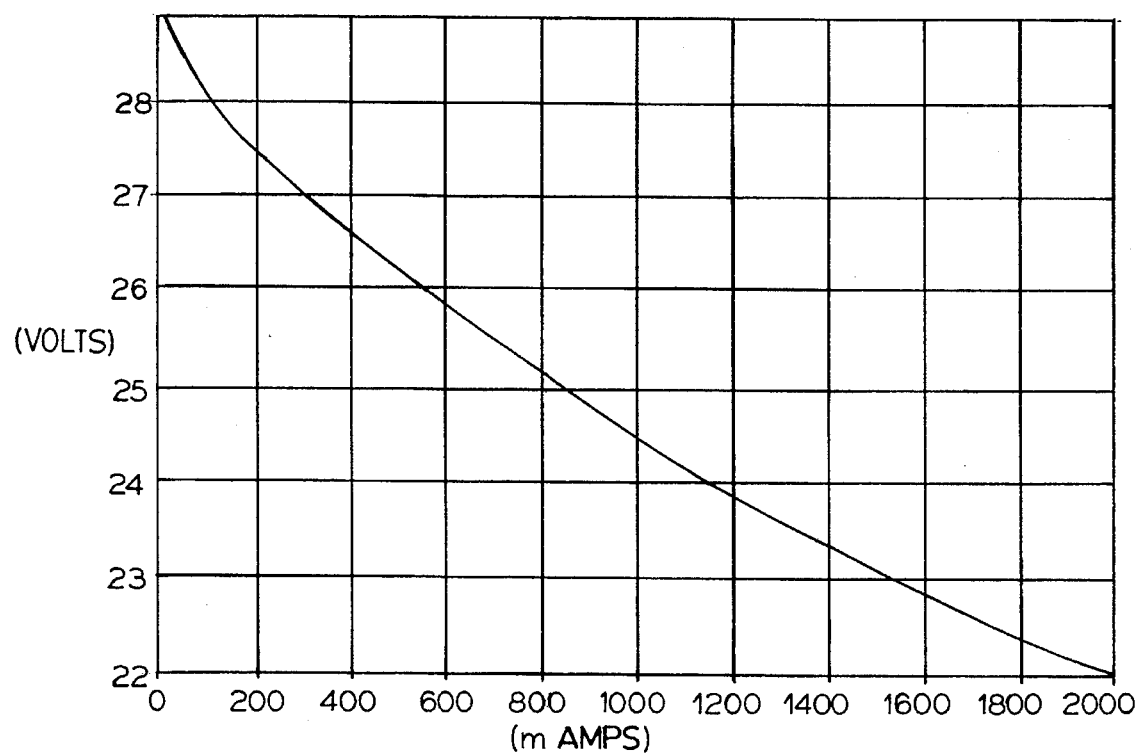
FIG. 4 shows a loading curve of another transformer plug-in power supply.

In FIG. 4, the loading curve of this latter embodiment is illustrated. As can be seen, the output voltage is maintained almost constant over a wide range of output current levels.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A plug-in transformer power supply apparatus, comprising:

a transformer housing having electrical prongs extending therefrom;

a step-down transformer located in said housing having a core, a primary winding and a secondary winding;

a rectifier means connected across said secondary winding for converting an AC voltage to a DC voltage, said rectifier means having an output;

a filter capacitor connected across said rectifier means output;

a thermal protector means for safeguarding an output load from an output short circuit; and a recycling thermal protector means for safeguarding said primary winding from excessive supply voltage or current, said recycling thermal protector means operatively connected between said electrical prongs and said primary winding;

the power supply apparatus characterized by output levels of at least 21 W while having a configuration still meeting UL Class 2 requirements, said core being sized and said primary and secondary windings having turns and wire sizes selected such that said power supply apparatus develops a load regulation curve that limits an output current of said secondary winding to a maximum of 8 amperes.

2. A plug-in transformer power supply apparatus, comprising:

a transformer housing having electrical prongs extending therefrom;

a step-down transformer located in said housing having a core, a primary winding and a secondary winding;

a rectifier means connected across said secondary winding for converting an AC voltage to a DC voltage;

a filter capacitor connected across said rectifier means;

a thermal protector means for safeguarding an output load from an output short circuit; and a recycling thermal protector means for safeguarding said primary winding from excessive supply voltage or current, said recycling thermal protector means operatively connected between said electrical prongs and said primary winding;

the power supply apparatus characterized by output levels of at least 21 W at 12 VDC while having a configuration still meeting UL Class 2 requirements, said core being sized and said primary and secondary windings having turns and wire sizes selected such that said power supply apparatus develops a load regulation curve that limits an output current of said secondary winding to a maximum of 8 amperes.

3. A power supply apparatus of claim 2, further comprising UL Class A insulation.

4. A power supply apparatus of claim 2, wherein said core comprises electrical grade ¾" lamination with a stack width of 1";

said primary winding has 600 nominal turns of 28 AWG with an approximate DC resistance of 15.6 ohms at 24° C.;

said secondary winding has 2×70 nominal turns of 21 AWG with an approximate DC resistance of 0.76 ohms at 24° C.; and a total equivalent internal resistance from said secondary winding side is approximately 1.61 ohms at 24° C.

5. A power supply apparatus of claim 4, further comprising UL Class A insulation.

6. A plug-in transformer power supply apparatus, comprising:

a transformer housing having electrical prongs extending therefrom;

a step-down transformer located in said housing having a core, a primary winding and a secondary winding;

a rectifier means connected across said secondary winding for converting an AC voltage to a DC voltage;

a filter capacitor connected across said rectifier means;

a thermal protector means for safeguarding an output load from an output short circuit; and a recycling thermal protector means for safeguarding said primary winding from excessive supply voltage or current, said recycling thermal protector means operatively connected between said electrical prongs and said primary winding;

the power supply apparatus characterized by output levels of at least 33.6 W at 24 VDC while having a configuration still meeting UL Class 2 requirements, said core being sized and said primary and secondary windings having turns and wire sizes selected such that limits said power supply apparatus develops a load regulation curve that limits an output current of said secondary winding to a maximum of 8 amperes.

7. A plug-in transformer power supply apparatus of claim 6, comprising UL Class B insulation.

8. A power supply apparatus of claim 6, wherein said core comprises electrical grade ¾" lamination with a stack width of 1.18";

said primary winding has 560 nominal turns of 28 AWG with an approximate DC resistance of 15 ohms at 24° C.;

said secondary winding has 105 nominal turns of 20 AWG with an approximate DC resistance of 0.45 ohms at 24° C.; and a total equivalent internal resistance from said secondary winding side is approximately 0.98 ohms at 24° C.

9. A power supply apparatus of claim 8, further comprising UL Class B insulation.

\* \* \* \* \*